United States Patent [19]

Lynch

[11] Patent Number: 5,187,843
[45] Date of Patent: Feb. 23, 1993

[54] RELEASABLE FASTENER ASSEMBLY

[76] Inventor: James P. Lynch, 13 S. Field, Lakewood, Colo. 80226

[21] Appl. No.: 642,634

[22] Filed: Jan. 17, 1991

[51] Int. Cl.⁵ ............................................... A41F 1/00
[52] U.S. Cl. ....................................... 24/576; 24/453; 24/587
[58] Field of Search ................. 24/460, 462, 453, 587, 24/588, 576; 160/229.1

[56] References Cited

U.S. PATENT DOCUMENTS

| | | |
|---|---|---|
| 684,113 | 10/1901 | Shaddle . |
| 2,354,485 | 7/1944 | Slaughter .......................... 24/587 X |
| 2,526,912 | 10/1950 | Swanson . |
| 2,897,889 | 8/1959 | Kessler . |
| 3,066,501 | 12/1962 | Charles et al. . |
| 3,460,282 | 8/1969 | Swirsky . |
| 3,661,689 | 5/1972 | Spanier ............................. 24/587 X |
| 4,047,337 | 9/1977 | Bergstrom . |
| 4,218,047 | 8/1980 | Douglas . |
| 4,785,565 | 11/1988 | Kuffner . |
| 4,830,080 | 5/1989 | Densen . |
| 4,935,995 | 6/1990 | Daus, Jr. .......................... 24/453 X |

FOREIGN PATENT DOCUMENTS

| | | | |
|---|---|---|---|
| 231305 | 3/1959 | Australia .......................... | 24/587 |
| 1007427 | 5/1952 | France .............................. | 24/587 |
| 2260972 | 9/1975 | France .............................. | 24/587 |
| 799146 | 8/1958 | United Kingdom ............. | 24/587 |

Primary Examiner—Laurie K. Cranmer
Attorney, Agent, or Firm—Timothy J. Martin; Dana S. Rewoldt

[57] ABSTRACT

A fastener assembly operative to interconnect flexible panels and other objects has a female piece and male piece which may be releasably fastened together. The female piece includes a web and a pair of opposed flanges which terminate in spaced-apart hook portions to provide a locking channel. The hook portions have interior first locking faces. The male piece includes a web with an enlarged male rib on an edge thereof so that the male rib provides outwardly projecting shoulders which have second locking faces. The male rib may be inserted through an entryway into said channel so as to be received in close-fitted engagement therein as it is engulfed by the flanges. The locking faces of the female and male piece engage one another to prevent withdrawal of the male rib under tension. However, the female and male pieces are constructed of stiff, resilient material so that the male rib may be cammed out of the channel by a torsional force. To this end, the male rib and the channel are configured to allow disengagement of the locking faces. The locking faces are angled, preferably at 45 degrees. The fastener assembly may be manufactured as strips, buckle-like elements or variations thereof.

20 Claims, 7 Drawing Sheets

RELEASABLE FASTENER ASSEMBLY

FIELD OF INVENTION

The present invention generally relates to the releasable interconnection of two objects or two portions of an object especially where the objects are subject to tension forces acting to separate the objects from one another. More specifically, however, the present invention concerns closures in the form of complimentary mated strips each of which may be connected to the margin of a flexible panel so as to releasably secure the margins together. Alternately, the strips may have reduced longitudinal length so as to be configured as fastening devices such as quick release belt buckles and the like.

BACKGROUND OF THE INVENTION

In the past, a wide variety of different assemblies have been developed to facilitate the joining of objects one to another. For example, there have been numerous techniques to attach complimentary flexible panels to each other, to attach a flexible panel to a mounting surface, to enclose or encase another object, to display information, to provide a buckle means, just to name a few. While it is impossible in the background of this invention to discuss the host of different specific structures used as fastening elements, a review of some of the general approaches employed by different fastening devices may be instructive.

One of the early techniques employed to releasably secure two panel sections together employed the use of lacing or ties which would be threaded through complimentary eyelets in the adjacent margins of the panel sections to be joined. The tie strings or lacing could then be cinched so as to draw the two margins together and hold them in position until released. As a variation on this technique, buttons were developed so that one panel margin was provided with buttons while the margin of the complimentary panel was provided with eyelets which would releasably receive the complimentary buttons. This general fastening technique further expanded to the elimination of the eyelets entirely so that complimentary snaps were provided on the panel margins to be joined.

Another edge joining technique that has been employed in a variety of applications is the zipper wherein a plurality of complimentary teeth may be engaged and disengaged with one another by means of a traveling slide so as to retain and release the edges of flexible panels together. This concept has in more recent times been adapted to the plastics industry mating rib and channels which are opened and closed with a traveling slide. Plastic storage bags also have this type of seal without employing the slide. Another technique of joining edges in a relatively continuous manner employs an elongated socket member into which the edges of flexible panels are stuffed. An elongated spline which is then forced into the socket and compressibly retained therein to hold the edges in the socket. Where a flexible panel is secured to a support surface, for example, there have been a variety of molding strips developed which provide jaw-like structures to clamp a salvage portion of a panel within a retaining channel. Spline and channel structures are likewise employed in this area of fastening.

Perhaps closer to the structure of the present invention is that fabric juncture assembly described in U.S. Pat. No. 4.935.995 issued Jun. 26, 1990 to Daus, Jr. In this patent, panel interlocks are provided by mating fabric edge connectors which are secured to respective margins of a pair of fabric panels to be interconnected with one another. The interlock structure shown in this patent utilizes a female receiving channel adapted to receive enlarged male head or rib of a mating connector. Interconnection is accomplished by means of sliding a respective rib into a receiving channel or forcibly penetrating the channel with the male rib. Angled shoulders are provided to accomplish a more positive panel juncture. Once joined, the connectors are not readily detachable from one another. This product is used as a protective casing for wiring harnesses and the like.

Despite the existence of the various connectors, described above, there remains a need for a connecting assembly which may be used with flexible panels that not only allows panel edges to be secured together, but also which allows non-sliding disengagement of such connectors.

SUMMARY OF THE INVENTION

It is an object of the present invention to provide a new and useful fastener construction which securely joins two objects against separation by tension forces yet which may readily allow the two objects to be disconnected from one another.

Another object of the present invention is to provide a fastening assembly configured either as matable elongated strips, as buckle-like fastening elements, or as a combination of a strip and individual elements which assembly employs matable profiles which may be engaged with one another in a planar direction and which may be released by torsion.

Another object of the present invention is to provide a fastener assembly that utilizes matable male and female profiles which, while releasable from one another, are not readily released upon tension forces.

A further object of the present invention is to provide a quick release fastening assembly that is simple in construction yet versatile in use.

Yet another object of the present invention is a fastening assembly which may be made out of integrally extruded plastic strips.

According to the broad form of the present invention, then, a fastener assembly is provided which is operative to releasably join first and second objects to one another The fastener assembly includes a female piece and a male piece, each formed of a stiff, resilient material and may be formed as a single partible extrusion. The female piece includes an elongate first web for attachment to a first object and a pair of elongate locking flanges which are connected to the first web at a common juncture. The flanges extend from the Web juncture in spaced-apart relation to one another to define an elongate locking channel; the flanges thus have opposed interior faces, Each flange terminates in an inwardly turned hook portion opposite said juncture so that an entryway is provided into to the locking channel. Each hook portion has a first locking face disposed in the interior of the channel and oriented at an acute angle with respect to the interior face of the respective flange.

The male piece includes an elongate male rib sized for insertion into the locking channel and an elongate second web portion trailing the male rib for attachment to a second object. The second web Portion has a pair of opposite side surfaces with the male rib being sized to provide a pair of outwardly projecting shoulders on either side of the second web. Each of these shoulders has a second locking face which is oriented at an acute angle with respect to the associated side surface.

The male piece and the female piece are locked together in a mated state by inserting the male rib into the elongate channel through the slot. To this end, the male rib is sized to have a larger transverse dimension than the channel entryway so that, upon advancement into the locking channel, the male rib deflects the flanges apart from one another after which the flanges resiliently return to engulf the male rib in such a manner that the first and second locking faces engage one another. To this end, also, the male rib may have a rounded front face area and the hook portions may have rounded exterior surface areas to facilitate opening of the flanges upon insertion of the male rib. The male and female pieces may be unlocked from one another by advancing the male rib toward the juncture thereby spreading the flanges apart from one another after which the first and second webs may be pivoted to cam the male rib out of the channel. In order to accomplish this, the first and second webs have sufficient stiffness whereby sufficient torsional forces may be applied to cause disengagement of the male rib from the locking channel.

Preferably, each of the flanges includes a first sidewall portion that extends from the juncture and a second sidewall portion formed as an extension of the first sidewall portion. The first sidewall portions accordingly diverge from one another, and it is preferred that the second sidewall portions be parallel to one another. With this construction, the locking channel has an entryway region proximate the entryway and sized to receive the male rib in close fitted engagement. A tapered region of the locking channel is located between the first sidewall portions and, as a result of the convergence of the first sidewall portions in a direction towards the juncture, the male rib acts to spread the flanges upon advancement towards the juncture. Further, in the preferred structure, the first and second locking faces are formed at a common acute angle, respectively, to the interior faces and the side surfaces. This acute angle may be selected to be in a range of 30°–60°, and preferably, 45°.

With this construction, the interior surfaces of the flanges have flat margin portions proximate the respective flat portions. The male rib may be configured for close-fitted receipt in the entryway region. Here, the male rib may have a second flat margin portion proximate each of the shoulders so that the first and second margin portions may engage one another when the male and female pieces are in the mated state. to this end also the first margin portions are substantially parallel to one another as are the second margin portions.

If desired, at least one of the first and second webs may be canted at a non-zero angle with respect to a mating plane containing the slot for the locking channel and the juncture when in the mated state. The web portions may also be provided with mounting channels sized to receive an edge portion of flexible panel, such as a piece of fabric. It may be further desirable to prevent relative longitudinal sliding of the male and female pieces with respect to one another. To this end, means may be provided to prevent such relatively longitudinal movement. For example, in one embodiment, endwalls are provided at opposite ends of the male rib, and the flanges have a longitudinal dimension such that, in the mated state, the plane is fit between the endwalls. Alternately, a ridge may be provided transversely to the elongate male rib and a corresponding slot structure may be provided in the flanges of the female piece to receive this ridge. The male and female pieces may be configured as elongated strips, as described above. In addition, the male and female pieces may be formed as buckle-like elements. Finally, if desired, one of the pieces may be an elongated strip. A plurality of mating pieces may then be provided for attachment at selected locations along the strip.

These and other objects of the present invention will become more readily appreciated and understood from a consideration of the following detailed description of the preferred embodiment when taken together with the accompanying drawings, in which:

DETAILED DESCRIPTION OF THE EXEMPLARY EMBODIMENTS

Figure 1:
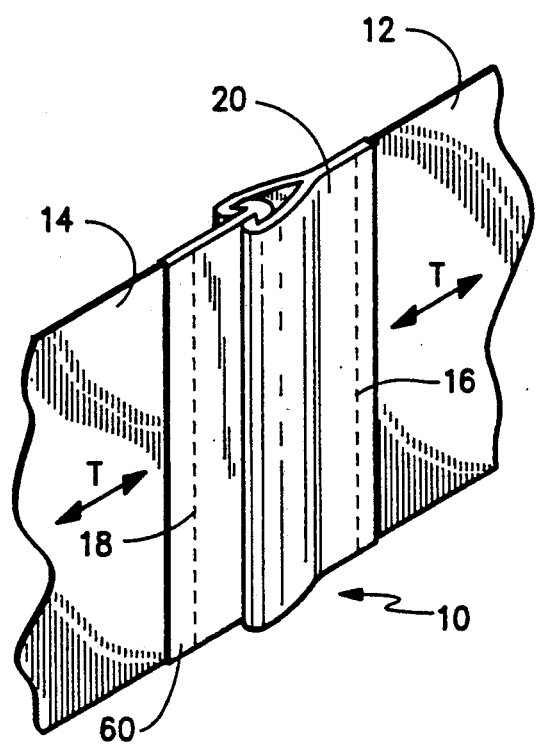
FIG. 1 is a perspective view of a fastening assembly according to a first exemplary embodiment of the present invention and shown interconnecting a pair of flexible panels to another.
Figure 2:
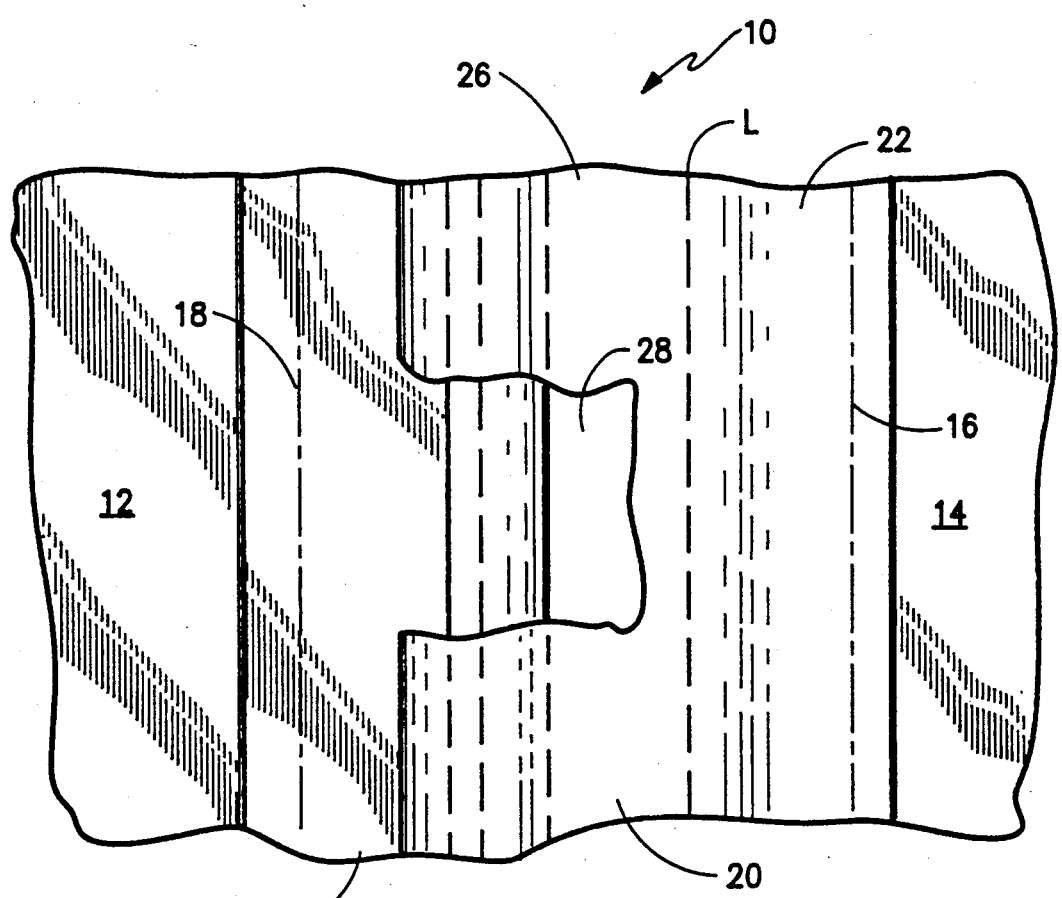
FIG. 2 is an enlarged front plan view of the fastener assembly shown in FIG. 1.
Figure 3:
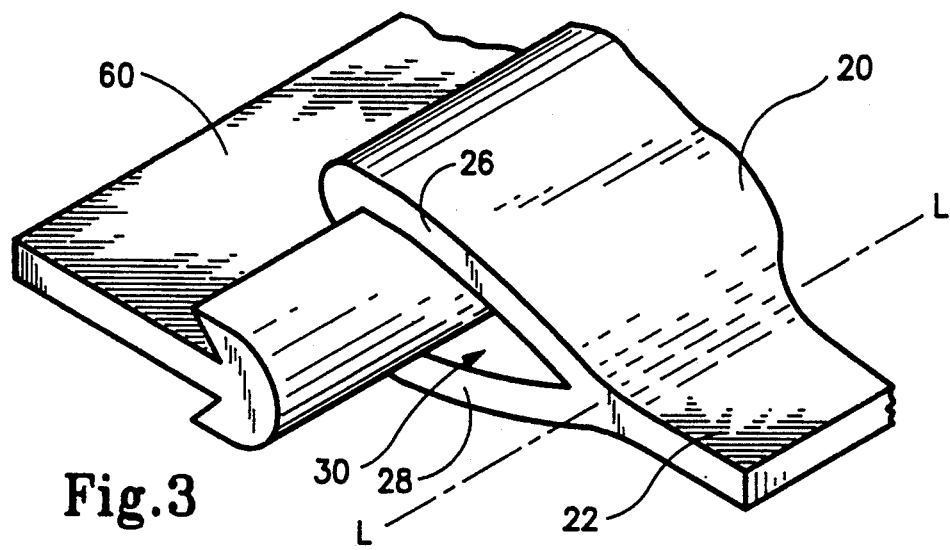
FIG. 3 is an enlarged perspective view showing the male and female pieces, in a mated state, according to the exemplary embodiment of the fastener assembly of the present invention.

The present invention broadly relates to fastener assemblies which may be configured as fastening strips, quick release buckle elements and the like. While the present invention, in strip form, is particularly useful for joining flexible panels, such as fabric panels, one another in tent and canopy apparatus, the structure disclosed in this application has much broader applications limited only by the abilities of the ordinarily skilled person in this field of invention. As such, the present invention is described with respect to particular exemplary embodiments which are thought to be illustrative of the novel mating structure of the present invention. It is not intended that this application be in any way limited to the specific embodiments disclosed herein.

In order to get an understanding of the broad structure comprising the fastener assembly of the present invention, reference is first made to FIGS. 1-5 wherein it may be seen that fastener assembly 10 is provided and, for example, may be employed to secure two objects, in the form of flexible panels 12 and 14, together. To this end, fastener assembly 10 includes a female piece 20 and a male piece 60 to which panels 12 and 14 may be secured in any convenient manner such as by stitching 16, 18 shown in FIGS. 1 and 2.

Female piece 20 includes an elongate first web 22 of any desired longitudinal length. First and second locking flanges 26 and 28 are connected to web 22 at juncture 24 that extends along juncture line "L". Flanges 26 and 28 are thus spaced-apart from one another and define an elongate locking channel 30. Flange 26 has an interior face 36 and flange 28 has an interior face 38, and thus faces 36S and 38 are in opposed facing relation to one another on opposite sides of channel 30. Flange 26 terminates in an inwardly turned hook portion 32 and flange 28 terminates in an inwardly turned hook portion 34 opposite juncture 28. Entryway 31 for channel 30 is therefore located between hook portions 32 and 34 with entryway 31 having a transverse dimension "$d_1$".

Figure 4:
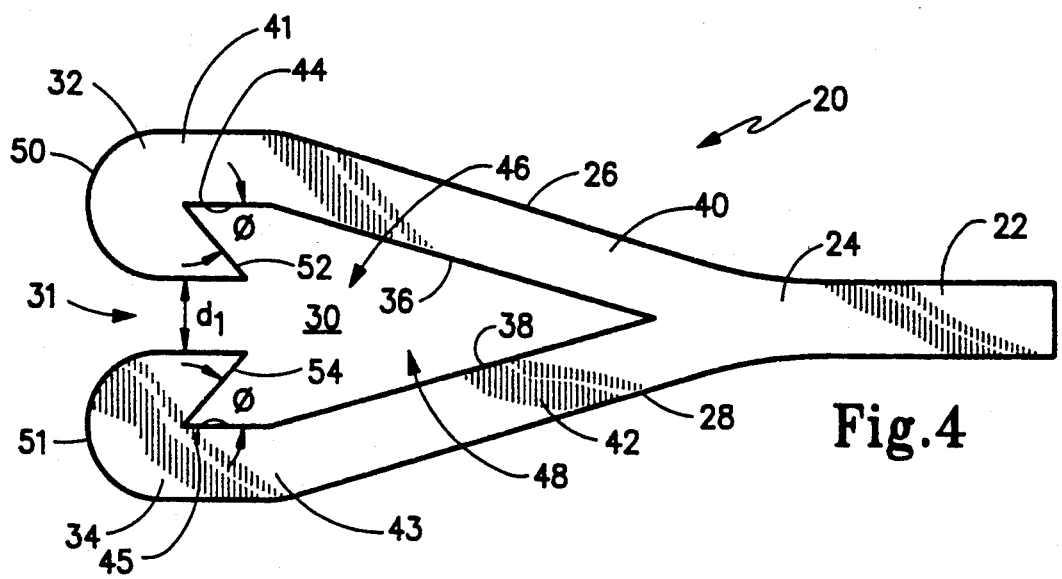
FIG. 4 is an end view in elevation showing the profile of the female piece of the fastener assembly of FIG. 3.

As is best shown in FIG. 4, flange 26 has a first sidewall portion 40 and a second sidewall portion 41 formed as an extension of first sidewall portion 40. Likewise, flange 28 includes a first sidewall portion 42 and a second sidewall portion 43 formed as an extension thereof. First sidewall portions 40 and 42 extend away from juncture 24 and diverge from one another while second sidewall portions 41 and 42 are substantially parallel to one another and provide substantially parallel flat margin portions 44 and 45 proximate the respective hook portions 32 and 34. Accordingly, locking channel 30 has an entryway region 46 adjacent entryway 31 and a tapered region 48 proximate juncture 24.

Inwardly turned hook portions 32 and 34 are provided with rounded exterior surface areas 50 and 51, respectively. First locking faces 52 and 54 are provided interiorly of female piece 20 on hook portions 32 and 34, respectively. Each of locking faces 52 and 54 are oriented at an angle $\phi$ with respect to flat margins 44 and 45, as described more thoroughly below.

Figure 5:
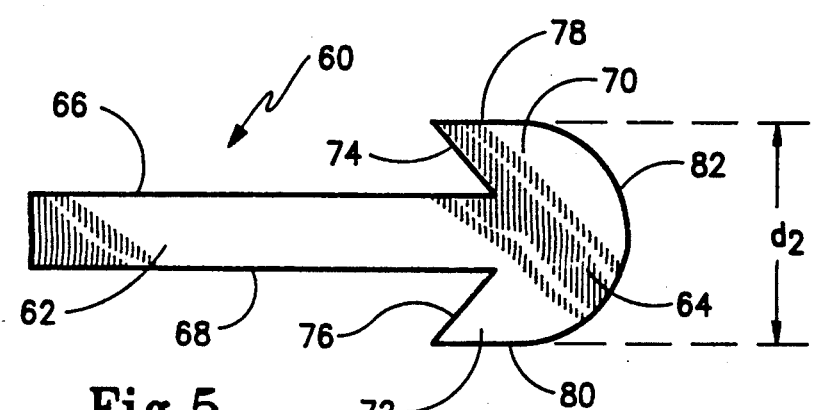
FIG. 5 is an end view in elevation showing the profile of the male piece of the fastener assembly of FIG. 3.

As is shown in FIG. 5 male piece 60 includes an elongate web 62 and a male rib 64 formed integrally therewith. Web 62 has opposite side surfaces 66 and 68 which are parallel to one another. Male rib 64 is enlarged in a transverse direction so as to provide a pair of shoulders 70 and 72 separated a distance "$d_2$" from one another. Shoulders 70 and 72 provide second locking faces 74 and 76, respectively, which are sized to engage first locking surfaces 52 and 54, as described more thoroughly below. Locking faces 74 and 76 are formed at an acute angle $\theta$ with respect to side surfaces 66 and 68. Furthermore, male rib 64 has a surface area extending between shoulders 70 and 72 and this surface includes flat margins portions 78 and 80 and an arcuate front surface area 82 which extends between flat margins 78 and 80. the width $d_2$ of male rib 64 is larger than the width $d_1$ of entryway 31 and which is approximately equal to the distance between flat margins 44 and 45 of entryway region 46 of locking channel 30.

Figure 6A:
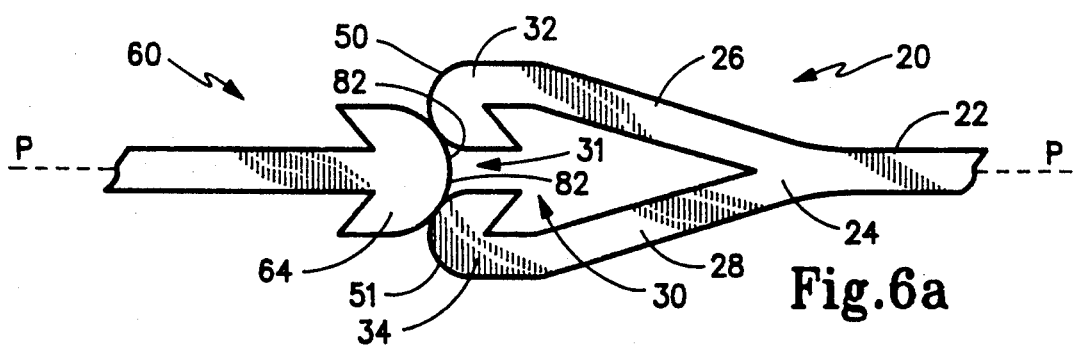
FIGS. 6(a)–6(c) are end views in elevation showing the female and male pieces of FIGS. 4 and 5 being engaged with one another.
Figure 6B:
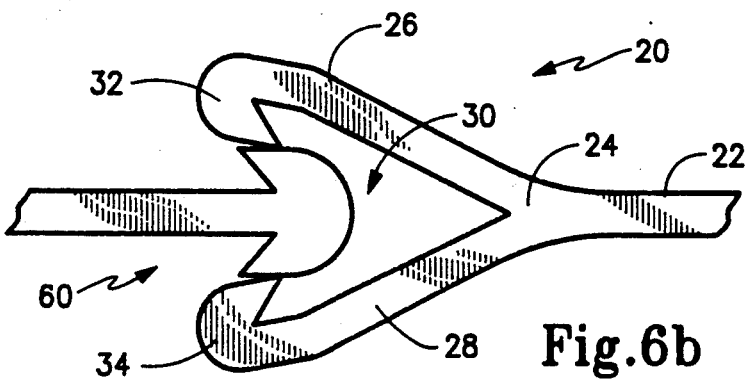
Figure 6C:
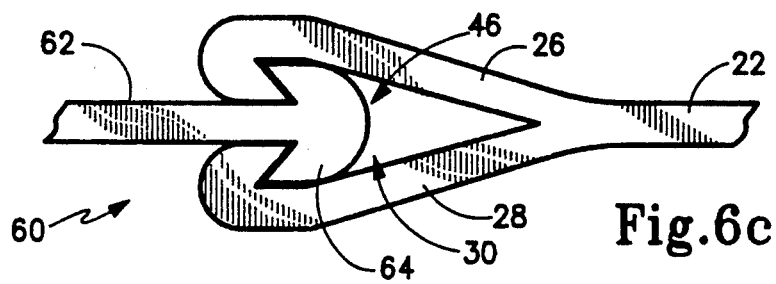

As is shown in FIGS. 6(a), 6(b) and 6(c) male piece 60 may be inserted into a mated state with female piece 20 by advancing male piece 60 in the direction of an attack plane P which is a plane that includes entryway 31 and juncture 24 of female piece 20. As is shown in FIG. 6(a), arcuate front surface 82 of male rib 64 may be advanced into an attack position where surface 82 contacts mounted exterior surfaces 50 and 51 of hook portions 32 and 34. Further advancement, into the position shown in FIG. 6(b), causes flanges 26 and 28 to spread apart from one another or deflect so that entryway 31 opens to accommodate the width of male rib 64. To this end, female piece 20 is formed of a stiff, resilient material, such as plastic, and is preferably an integral piece of molded construction. Further advancement of male rib 64 toward juncture 24 positions male rib 64 in entryway region 46 so that flanges 26 and 28 return to their normal state with hook portions 32 and 34 engulfing male rib 64. Since flat margins 44 and 45 are similar in size to margins 78 and 80, these margins engage one another.

Figure 7:
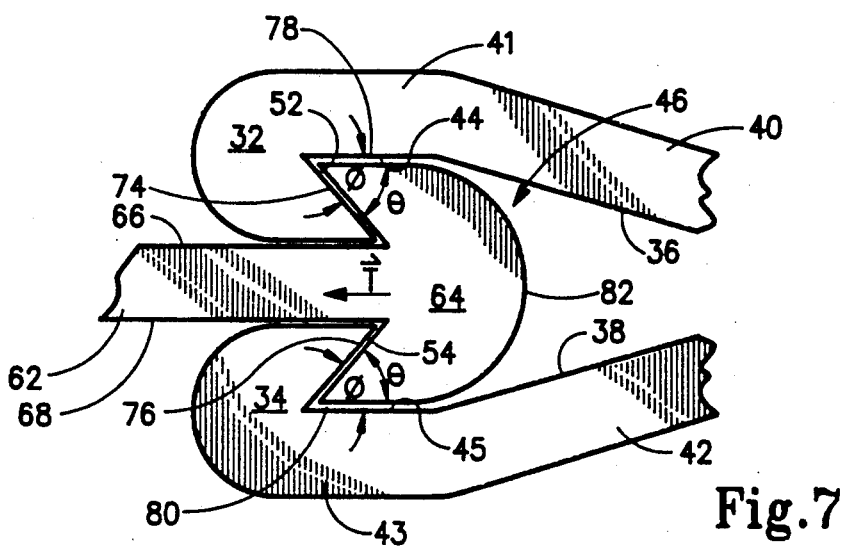
FIG. 7 is an enlarged end view in elevation showing the engagement of the male and female pieces.

In the mated position, as best shown in FIG. 7, male rib 64 is sized for close fitted receipt in entryway region 46. In this position, first locking face 52 engages second locking face 74 and first locking face 54 engages second locking face 76. Preferably angles $\phi$ and $\theta$ are common acute angles within a range of 30°-60°, and it has been found quite suitable that each of these angles is approximately 45°. As a result of the angled locking faces, tension forces, represented by vector $\vec{T}$, which would tend to separate male piece 60 from female piece 20 actually draws flanges 26 and 28 together to grip male rib 64 to resist disengagement thereof.

Figure 8A:
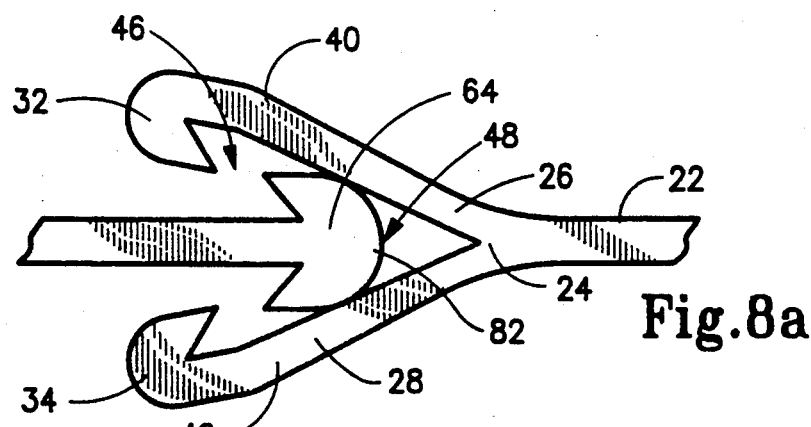
FIGS. 8(a)–8(d) show end views in elevation of the female and male pieces of FIGS. 4 and 5 being disengaged from one another.
Figure 8B:
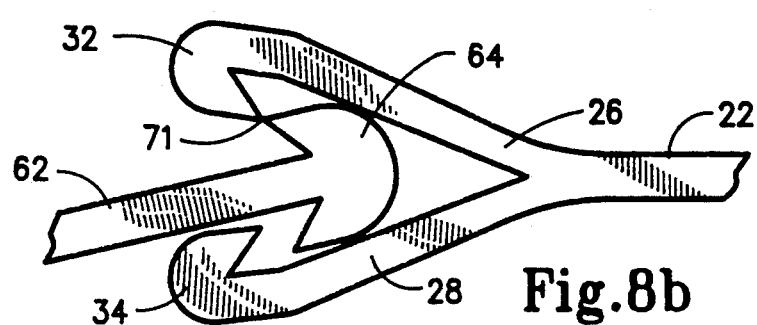
Figure 8C:
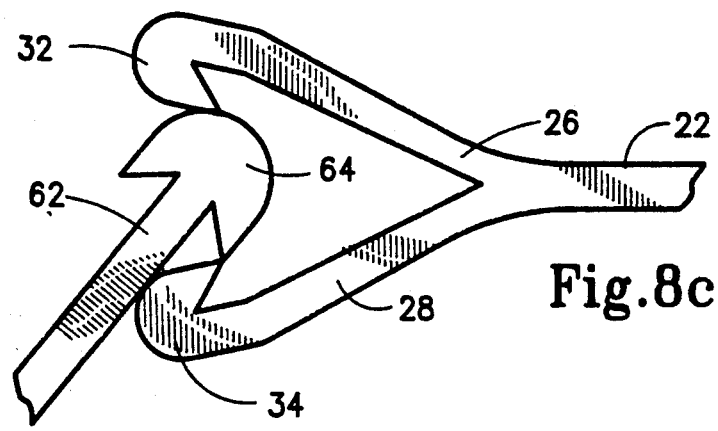
Figure 8D:
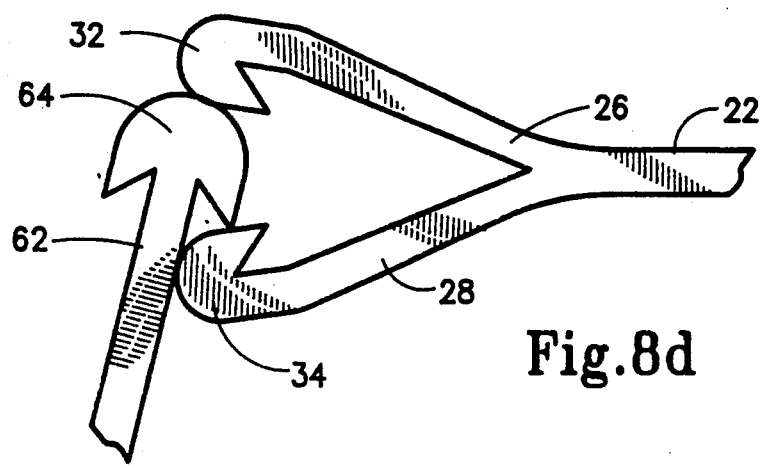

The disengagement of male piece 60 from female piece 20 is best shown in FIGS. 8(a)-8(d). Here, it should be appreciated that male piece 60, like female piece 20, is formed as an integral piece of stiff, resilient material and it is necessary that webs 22 and 62 have sufficient stiffness to permit male rib 64 to be cammed out of locking channel 30 as described below. More specifically, as is shown in FIG. 8(a) disengagement is accomplished by first advancing male rib 64 toward juncture 24 so that male rib 64 moves into tapered region 48 of locking channel 30 so that surface 82 attacks first sidewall portions 40 and 42 of flanges 26 and 28, respectively. This movement disengages the first and second locking faces and further acts to slightly spread flanges 26 and 28 apart from one another. Webs 22 and 62 may then be pivoted with respect to one another so that web 62 contacts one of hook portions 32 and 34. The contacted hook portion then acts as fulcrum with web 62 providing a lever so that torsional force is exerted on male rib 64. This torsional force further spreads flanges 26 and 28 until edge 71 clears shoulder 70 and disengages from hook portion 32, shown in FIG. 8(b). Male rib 64 may be then withdrawn until shoulder 72 is moved into contact with hooked portion 34. Web 62 is pivoted farther so that male rib 64 to be cammed outwardly through entryway 31 to disengage male piece 60 from female Piece 20 as shown in FIGS. 8(c) and 8(d).

Figure 9:
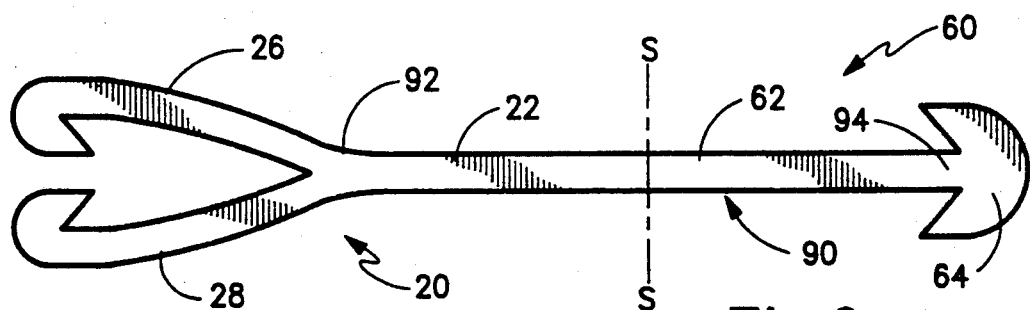
FIG. 9 is an end view in elevation showing a common extrusion profile for the male and female pieces of FIGS. 1–8.

As is shown in FIG. 9, a convenient manufacturing technique of the present invention provides that female piece 20 and male piece 60 are formed as a single extrusion of stiff, resilient plastic material, such as is known in the extrusion art. After formation, male piece 60 and female piece 20 are cut from one another around severance plane "S" so that webs 22 and 62 are provided out of a central panel section 90. The locking structure in the form of flanges 26, 28 is formed along edge 92 of panel 90 while male rib 64 is formed along edge 94 of panel 90. Alternately, of course, female piece 20 and male piece 60 may be molded independently of one another.

Figure 10:
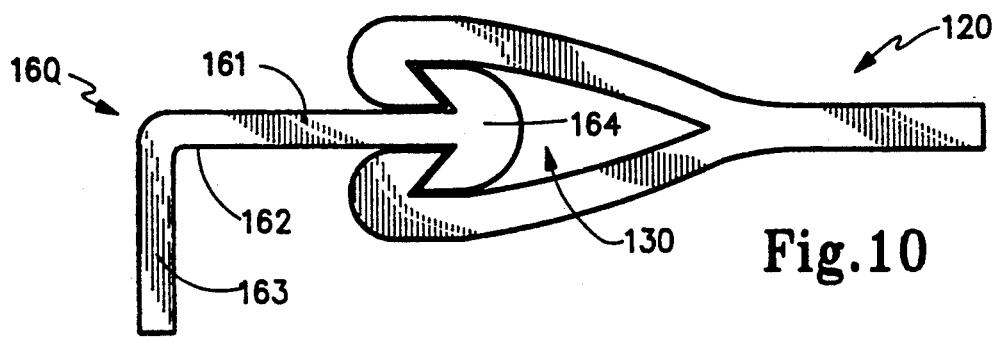
FIG. 10 is an end view in elevation showing the profile for a second exemplary embodiment of the present invention.

FIG. 10 shows an alternate embodiment of the present invention where it may be seen that female piece 120 is constructed identically to female piece 20 so that no further description is provided herein. On the other hand, male piece 160 is structured somewhat differently. Male piece 160 has an angled or canted web 162 formed by web sections 161 and 163 which are oriented at an angle with respect to one another. In FIG. 10, web sections 162 and 163 are formed perpendicularly to one another. Male rib 164 is lockably received in locking channel 130 of female piece 120 and may be locked and released in the manner described above. Naturally, web 162 could be canted at angles other than 90°.

Figure 11:
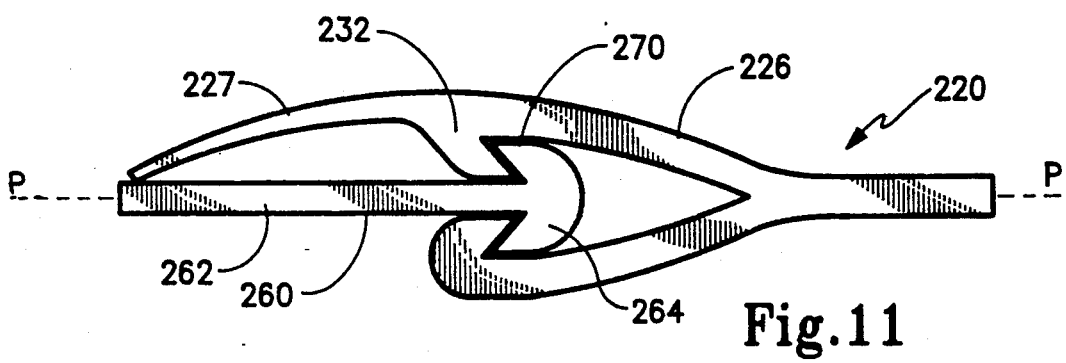
FIG. 11 an end view in elevation showing the profile of a third exemplary embodiment of the fastener assembly of the present invention.

Another alternate embodiment of the present invention is shown in FIG. 11. Here, male piece 260 is constructed identically to male piece 60 however female piece 220 is constructed somewhat differently. In FIG. 11, it may be seen that flange 226 does not terminate in a hooked portion but rather an interior hook 232 is provided to engage shoulder 270 of male rib 264. Hook 232 is formed similarly to hook portion 32 but, as is shown in FIG. 11, an extension wing 227 projects outwardly as a continuation of flange 226. Wing 227 is arcuate in shape so that, when male piece 260 and female piece 220 are in the mated state, as shown in FIG. 11, wing 227 curves toward the attack plane P and contact web 262 of male piece 260. This wing 227 helps seal the structure, in the mated state, against intrusion of water, etc.

Figure 12:
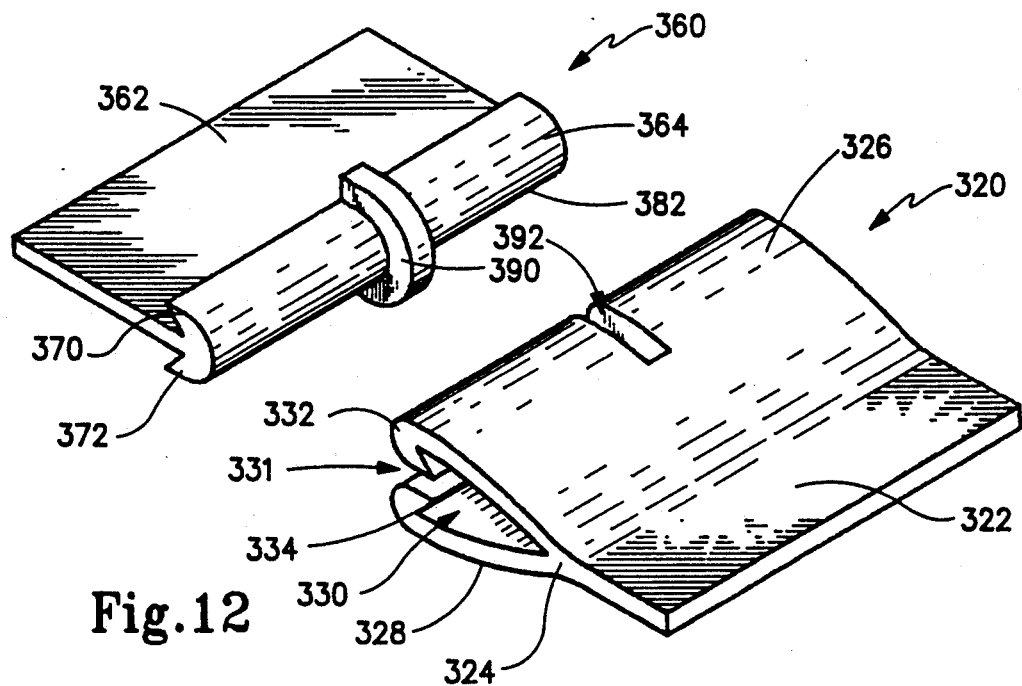
FIG. 12 is a perspective view of another embodiment of the present invention, in the form of a quick release buckle, according to the present invention.
Figure 13:
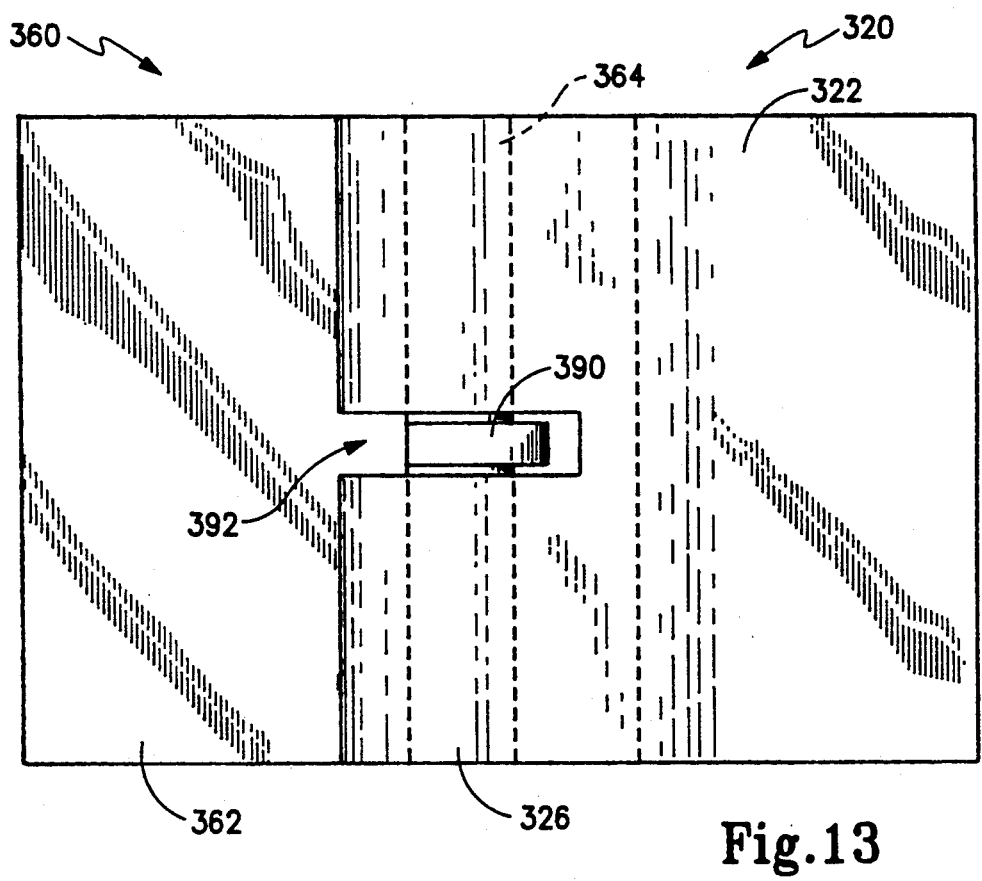
FIG. 13 is a top plan view of the buckle fastener of FIG. 12, shown in the mated state.

As noted above, rather than configuring female piece 20 and male piece 60 as elongated strips, it is within the scope of this invention to construct the male and female pieces as buckle-like elements. Thus, as is shown in FIGS. 12 and 13, matable female and male buckle pieces 320 and 360 may be constructed according to yet another exemplary embodiment of this invention. Female piece 320 includes a web section 322 and a pair of flanges 326 and 328 which form a locking channel 330 therebetween. Flange 326 terminates in a reversed curved hook portion 332 while flange 328 terminates in hooked portion 334 similar to that described above. Flanges 326 and 328 extend from juncture 324 with web 322. Male Piece 360 is constructed somewhat similarly to male piece 60 and includes a web section 362 and a male rib 364 which has a pair of shoulders 370 and 372. Male rib 364 has arcuate front face 382 which may be advanced against hooked portions 332, 334 thereby spreading flanges 326 and 328 to allow male rib 364 to be inserted into locking channel 330 through entryway 331. In order to prevent longitudinal displacement of male rib 364 and channel 330, a ridge 390 is provided with ridge 390 extending circumferentially around male rib 364 centrally thereon. A mating slot structure 392 is provided in flanges 326 and 328 of female piece 320 with slot structure 392 being sized to matably receive ridge 390, as in shown in FIG. 13. Thus, the cooperative engagement of ridge 390 and slot structure 392 prevents displacement of male rib 360 that might otherwise be caused by longitudinal sliding of male rib 364 in locking channel 330.

Figure 14:
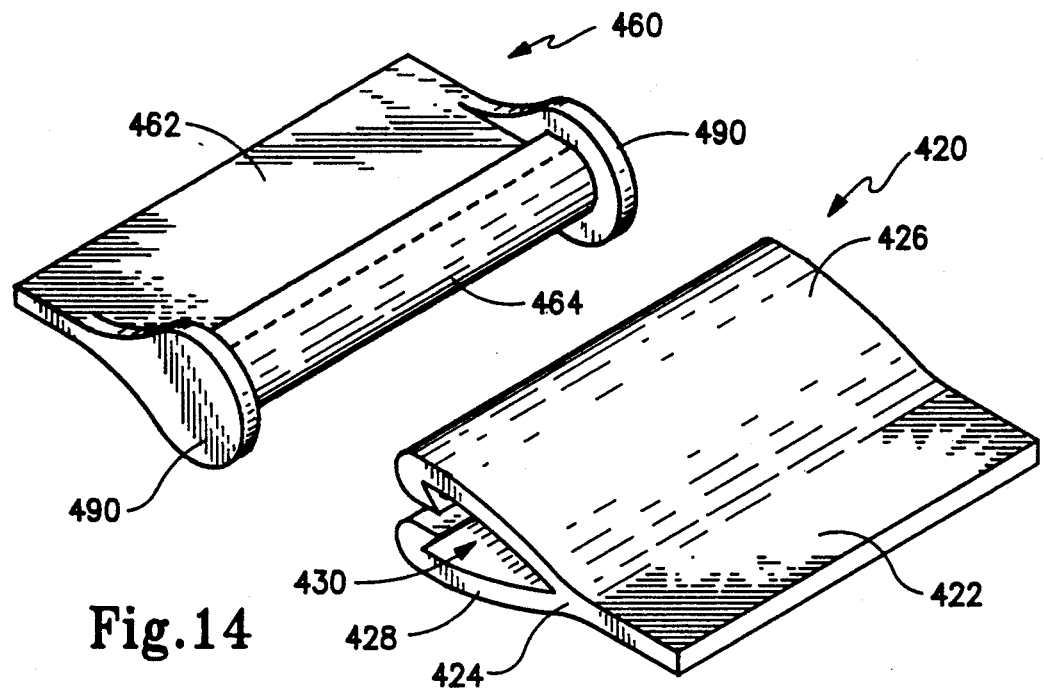
FIG. 14 is a perspective view of a second alternate buckle fastener according to the present invention.

An alternate structure to prevent longitudinal sliding, when the present invention is used as a buckle device, is shown in FIG. 14. Here, female piece 420 is formed as a section of strip 20 and has flanges 426 and 428 extending from juncture 424 with web section 422. A male rib 464 of male piece 460 is provided for mated engagement in channel 430 formed between flanges 426 and 428, as described above. However, in order to prevent longitudinal displacement, a pair of endwalls 490 are provided at each end of male rib 424 and may be formed integrally with web section 462 of male piece 460. Endwalls 490 are longitudinally separated a distance slightly greater than the longitudinal length of flanges 426 and 428 so that, when mated together, rib 464 may not slide longitudinally out of channel 430.

Figure 15:
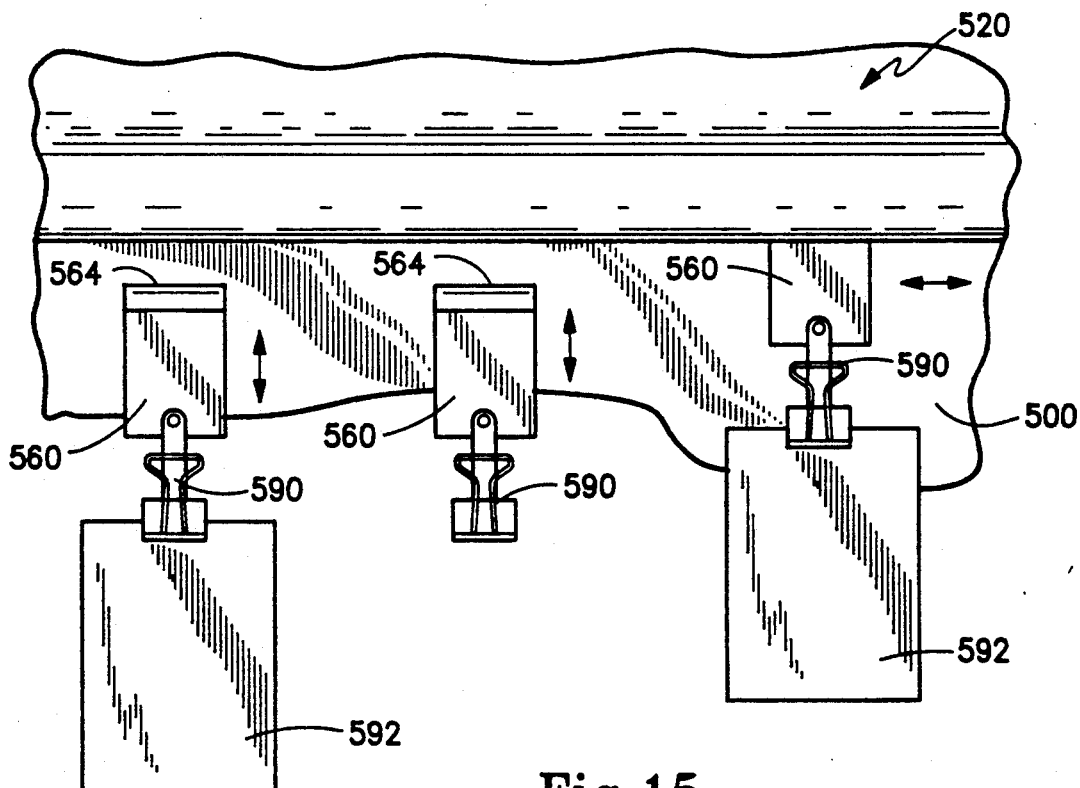
FIG. 15 is a front view in elevation showing a strip mounting assembly using the fastening elements according to the present invention.

Not only may the present invention be utilized as buckle-like elements or as fastener strips for flexible panels but also the present invention may be employed to interconnect other objects, one to another. An illustrative example is shown in FIG. 15 wherein a female piece 520 in form of an elongated strip that is identical to female piece 20 is shown attached to a support surface 500, and a plurality of male elements 560 are provided each of which may matably engage female strip 520. Each male element 560 is constructed similarly to male element 60, for example, includes a spring clip 590 at a distal edge thereof opposite male rib 564. Spring clips 590 may then attach other objects, such as note pages 592.

Figure 16:
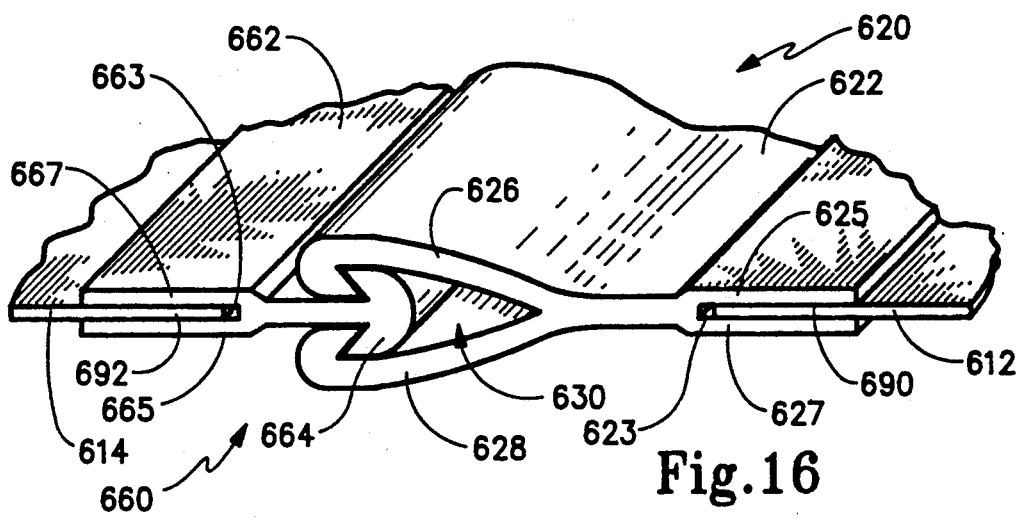
FIG. 16 is a final exemplary embodiment showing an alternate method for securing flexible panels to the male and female strips of the present invention.

Finally, with reference to FIG. 16, it may be seen that the male and female pieces may be provided with a panel receiving channel formed in their respective web portions. Thus, for example, female piece 620 has a web portion 622 provided with a panel channel 623 that opens oppositely locking channel 630 formed between flanges 626 and 628. Panel channel 623 is located between leg portions 625 and 627 of web portion 622 and receives a margin portion 690 of a panel 612 with margin portion 690 being secured in any convenient manner in channel 623. Likewise, male elements 660 has a web portion 662 provided with a panel channel 663 operative to receive margin 692 of panel 614 between leg portions 665 and 667 thereof. Margin 692 is again secured in channel 663 in any convenient manner. Male rib 664 is again provided to engage locking channel 630 between flanges 626 and 628.

Accordingly, the present invention has been described with some degree of particularity directed to the preferred embodiment of the present invention. It should be appreciated, though, that the present invention is defined by the following claims construed in light of the prior art so that modifications, changes, and/or additions may be made to the preferred embodiment of the present invention without departing from the inventive concepts contained herein.

I claim:

1. A fastener assembly operative to releasably join first and second objects to one another, comprising:
   (a) a female piece formed of a stiff, resilient material, said female piece including a first web for attachment to a first object and a pair of opposed locking flanges connected to said first web at a juncture and extending from the juncture in spaced-apart relation to one another to define a locking channel having an interior, said flanges having opposed interior faces and each terminating in an inwardly turned hook portion opposite said juncture to form an entryway into said locking channel, each said hook portion having a first locking face disposed interiorly of the channel and oriented at an acute angle $\phi$ with respect to the respective interior face thereof; and (b) a male piece formed of a stiff, resilient material and configured to releasably engage said female piece in a mated state, said male piece including a male rib sized for insertion into the locking channel and a second web portion connected to said male rib for attachment to a second object, said second web portion having a pair of opposite side surfaces with said male rib sized so that pair of outwardly projecting shoulders are disposed on either side of said second web with each of said shoulders having a second locking face oriented at an acute angle $\theta$ with respect to its associated said side surface whereby said male piece and said female piece may be locked together by advancing said male rib through said entryway and into said locking channel, said male rib sized to have a larger transverse dimension than said entryway so that, upon advancement into said locking channel, said male rib deflects said flanges apart from one another after which said flanges resiliently return to engulf said male rib with said first and second locking faces releasably engaging one another and whereby said male piece and said female piece permit non-sliding disengagement from one another by advancing said rib toward said juncture to spread said flanges apart from one another after which said first and second webs may be pivoted with respect to one another so that said male rib is cammed out of said locking channel, said material forming said first and second webs having of sufficient stiffness so that sufficient torsional force may be applied to said flanges and said male rib to cause non-sliding disengagement of said male rib from said locking channel.

2. A fastener assembly according to claim 1 wherein said female piece and said male piece are constructed as a common extrusion.

3. A fastener assembly according to claim 1 wherein the acute angles $\phi$ and $\theta$ are approximately equal and are within a range of thirty to sixty degrees, inclusive.

4. A fastener assembly according to claim 3 wherein the acute angles $\phi$ and $\theta$ are each approximately forty-five degrees.

5. A fastener assembly according to claim 1 wherein the interior surface of each of said flanges has a first flat margin portion proximate the respective hook portion and wherein the outer surface of said male rib has a second flat margin portion proximate each of said shoulders with the first and second margin portions being sized to engage one another in the mated state.

6. A fastener assembly according to claim 5 wherein the first flat margin portions are substantially parallel to one another and wherein the second flat margin portions are substantially parallel to one another.

7. A fastener assembly according to claim 1 wherein at least one of said first and second webs has a canted web portion that is oriented at a non-zero angle with respect to an attack plane containing the entryway and said juncture when said male and female pieces are in the mated state.

8. A fastener assembly according to claim 1 adapted to join first and second flexible panels and wherein said female piece has a first panel channel opposite said flanges and sized to receive an edge portion of a first flexible panel and wherein said male piece has a second panel channel opposite said male rib and sized to receive an edge portion of a second flexible panel.

9. A fastener assembly according to claim 1 including means for preventing relative longitudinal movement of said female and male pieces in a longitudinal direction when in the mated state.

10. A fastener assembly according to claim 9 wherein said means for preventing longitudinal movement includes an endwall at opposite ends of said male rib, said flanges having a longitudinal dimension such that, in the mated state, said flanges fit between said endwalls.

11. A fastener assembly according to claim 9 wherein said means for preventing longitudinal movement includes a ridge projecting transversely of said elongate male rib and extending peripherally therearound and a corresponding slot structure formed in said flanges whereby, in the mated state, said ridge engages the slot structure in said flanges.

12. A fastener assembly according to claim 1 wherein said female piece is formed as a strip of material which may be secured to a selected support surface as said first object and including a plurality of said male pieces which may be releasably mated to said female piece, each of said male pieces having means for releasably securing a second object thereto.

13. A fastener assembly according to claim 1 wherein said male rib has an outer surface extending between said shoulders with the outer surface having a rounded front face area operative upon insertion of said male rib into said slot to attack exterior surface areas of said hook portions to thereby spread said flanges apart.

14. A fastener assembly according to claim 13 wherein the exterior surface areas of said hook portions are rounded.

15. A fastener assembly operative to releasably join first and second objects to one another, comprising:

(a) a female piece formed of a stiff, resilient material, said female piece including an elongate first web for attachment to a first object and a pair of opposed elongate locking flanges connected to said first web at a juncture and having first sidewall portions extending from said juncture and diverging from one another and second sidewall portions formed as extensions of said first sidewall portions, said second sidewall portions oriented in spaced-apart relation to one another, said flanges defining an elongate locking channel having an interior with each said flange terminating in an inwardly turned hook portion opposite said juncture, said hook portions spaced from one another to form an entryway into said locking channel, each said hook portion having a first locking face disposed interiorly of the channel and oriented at an acute angle $\phi$ with respect to the respective interior face thereof, said locking channel having an interior entryway region proximate said entryway and between said second sidewall portions and an interior tapered region between said first sidewall portions; and (b) a male piece formed of a stiff, resilient material and configured to releasably engage said female piece in a mated state, said male piece including an elongate male rib adapted to be inserted into the locking channel and received in the entryway region thereof in close-fitted engagement, said male piece including an elongate second web portion connected to said male rib for attachment to a second object, said second web portion having a pair of opposite side surfaces with said male rib sized so that a pair of outwardly projecting shoulders are disposed on either side of said second web with each of said shoulders having a second locking face oriented at an acute angle $\phi$ with respect to its associated said side surface whereby said male piece and said female piece may be locked together by advancing said male rib through said entryway and into said locking channel, said male rib sized to have a larger transverse dimension than said entryway so that, upon advancement into said locking channel, said male rib deflects said flanges apart from one another after which said flanges resiliently return to engulf said male rib with said first and second locking faces engaging one another and whereby second locking faces engaging one another and whereby said male piece and said female piece maybe unlocked from one another by advancing said rib toward said juncture and into the tapered region between said first sidewall portions so that said male rib operates to spread said flanges apart from one another after which said first and second webs maybe pivoted with respect to one another so that said male rib is cammed out of said locking channel by leverage of said second web against one of said hook portions, said material forming said first and second webs being of sufficient stiffness such that torsional force maybe applied thereby to said flanges and said male rib sufficiently to cause disengagement of said male rib from said locking channel.

16. A fastener assembly according to claim 15 wherein the acute angle $\phi$ and $\theta$ at which said first and second locking faces are formed are approximately equal and are within a range of thirty to sixty degrees, inclusively.

17. A fastener assembly according to claim 15 including means for preventing relative longitudinal movement of said female and male pieces in a longitudinal direction when in the mated state.

18. A fastener assembly according to claim 15 wherein said male rib has an outer surface extending between said shoulders with the outer surface having a rounded front face area operative upon insertion of said male rib into said entryway to attack exterior surface areas of said hook portions to thereby spread said flanges apart.

19. A fastener assembly according to claim 18 wherein the exterior surface areas of said hook portions are rounded.

20. A fastener assembly operative to releasably join first and second objects to one another, comprising:

(a) a female piece formed of a stiff, resilient material and including a first web for attachment to a first object and a pair of opposed locking flanges connected to said first web at a juncture, said locking flanges extending from the juncture in spaced-apart relation to define locking channel having an interior such that said flanges have opposed interior faces, said locking flanges each terminating in an inwardly turned hook portion opposite said juncture to form an entryway into said locking channel with said locking channel having first length between said juncture and said entryway, each said hook portion having a first locking face disposed interiorly of the channel and oriented at an acute angle $\phi$ with respect to the respective interior face thereof; and (b) a male piece formed of a stiff, resilient material and configured to releasably engage said female piece in a mated state, said male piece including a male rib sized for insertion into the locking channel and a second web portion connected to said male rib for attachment to a second object, said second web portion having a pair of opposite side surfaces with said male rib sized so that a pair of outwardly projecting shoulders are disposed on either side of said second web with each of said shoulders having a second locking face oriented at an acute angle $\theta$ with respect to its associated said side surface whereby said male piece and said female piece may be locked together by advancing said male rib through said entryway and into said locking channel, said male rib sized to have a larger transverse dimension than said entryway so that, upon advancement into said locking channel, said male rib deflects said flanges apart from one another after which said flanges resiliently return to engulf said male rib with said first and second locking faces engaging one another and whereby said male piece and said female piece may be unlocked from one another by advancing said rib toward said juncture to spread said flanges apart from one another, said material forming said first and second webs being sufficiently stiff and said first length of said locking channel being configured to have sufficient length so that torsional force may be applied to said flanges and said male rib so that said male rib is cammed out of said locking channel whereby said male rib is disengaged from said locking channel.

* * * * *